United States Patent [19]
Zuili et al.

[11] Patent Number: 6,145,084
[45] Date of Patent: Nov. 7, 2000

[54] ADAPTIVE COMMUNICATION SYSTEM ENABLING DISSIMILAR DEVICES TO EXCHANGE INFORMATION OVER A NETWORK

[75] Inventors: Patrick Zuili, Boulogne, France; Edward Ice, Atlanta, Ga.

[73] Assignee: Net i Trust, Westport, Conn.

[21] Appl. No.: 09/168,531

[22] Filed: Oct. 8, 1998

[51] Int. Cl.[7] .................................................. H04L 9/00
[52] U.S. Cl. .......................................... 713/201; 713/200
[58] Field of Search ..................... 713/201, 200, 713/202

[56] References Cited

U.S. PATENT DOCUMENTS

| | | | |
|---|---|---|---|
| 4,458,109 | 7/1984 | Mueller-Schloer | 178/22.11 |
| 4,893,330 | 1/1990 | Franco | 379/91 |
| 5,172,413 | 12/1992 | Bradley et al. | 380/20 |
| 5,181,238 | 1/1993 | Medamana et al. | 379/95 |
| 5,239,294 | 8/1993 | Flanders et al. | 340/825.34 |
| 5,313,521 | 5/1994 | Torii et al. | 380/21 |
| 5,392,357 | 2/1995 | Bulfer et al. | 380/33 |
| 5,465,290 | 11/1995 | Hampton et al. | 379/67 |
| 5,506,961 | 4/1996 | Carlson et al. | 395/186 |
| 5,542,046 | 7/1996 | Carlson et al. | 713/200 |
| 5,544,322 | 8/1996 | Cheng et al. | 395/200.12 |
| 5,602,933 | 2/1997 | Blackwell et al. | 382/116 |
| 5,638,431 | 6/1997 | Everett et al. | 379/115 |
| 5,640,446 | 6/1997 | Everett et al. | 379/115 |
| 5,671,279 | 9/1997 | Elgamal | 380/23 |
| 5,689,565 | 11/1997 | Spies et al. | 380/25 |
| 5,689,708 | 11/1997 | Regnier et al. | 395/682 |
| 5,706,286 | 1/1998 | Reiman et al. | 370/401 |
| 5,706,427 | 1/1998 | Tabuki | 713/201 |
| 5,708,780 | 1/1998 | Levergood et al. | 395/200.12 |
| 5,720,035 | 2/1998 | Allegre et al. | 709/225 |
| 5,745,559 | 4/1998 | Weir | 379/199 |
| 5,745,574 | 4/1998 | Muftic | 380/23 |
| 5,745,879 | 4/1998 | Wyman | 705/1 |
| 5,748,736 | 5/1998 | Mittra | 380/21 |
| 5,778,173 | 7/1998 | Apte | 395/187.01 |
| 5,978,373 | 11/1999 | Hoff et al. | 370/392 |
| 5,978,940 | 11/1999 | Newman et al. | 714/712 |
| 5,987,232 | 11/1999 | Tabuki | 395/187.01 |
| 5,987,633 | 11/1999 | Newman et al. | 714/712 |

FOREIGN PATENT DOCUMENTS

0807911A2  12/1997  European Pat. Off. .

*Primary Examiner*—Ly V. Hua
*Attorney, Agent, or Firm*—Gifford, Krass, Groh, Sprinkle, Anderson & Citkowski, PC

[57] ABSTRACT

Methods and apparatus enabling dissimilar devices to exchange information over a computer network stores a database of permissible sending and receiving devices at a verification server. A first device generates a request send authorization signel, which is compared at the server to the stored database and, in the event of a correspondence, a send authorization signel is generated by the server. Before a complete exchange may occur, however, a request receive authorization signal is generated at the second device in response to receiving the communication signal from the first device. The request receive authorization signal is compared to the database at the server and, in the event of a correspondence, a receive authorization signal is generated by the server, causing the second device to receive the message from the first device. A translation function is preferably provided prior to the step of causing the second device to receive the message from the first device, which may be related to dissimilar device hardware, software device protocol, network security, domestic/international communication standards, language or other factors, as appropriate.

21 Claims, 5 Drawing Sheets

ADAPTIVE COMMUNICATION SYSTEM ENABLING DISSIMILAR DEVICES TO EXCHANGE INFORMATION OVER A NETWORK

FIELD OF THE INVENTION

The present invention relates generally to computer networks and, more particularly, to an adaptive, open system architecture providing protocol conversion, verification, and translation functions enabling dissimilar systems to communicate over an existing infrastructure.

BACKGROUND OF THE INVENTION

Electronic networks originally incorporated similar types of devices specifically designed to communicate with one another. Perhaps the earliest type of network was the telephone system, which allows each handset to communicate with other, identical handsets through a switch. The earliest computer networks consisted of a terminals which were designed to communicate with a mainframe or host computer, thus allowing numerous terminals to use the resources of the host.

Over the years, however, the distinction between computer networks and phone networks has become blurred. Phone networks now allow computers to communicate with each other and, networks of computers now facilitate telephonic communicates. Companies use internal computer and telephonic networks to support office functions, and these internal networks are further connected to the wide-area networks and the Internet via telephone lines or other links. Such configurations allow computing and communication devices to communicate with other types of devices across a broad range of configurations. Other existing network variations include cellalar telephone networks, automated teller machines and various private communications systems used in business and commerce. By far the most rapidly expending network is the Internet, which is actually a collection of computer networks interconnected by a protocol known as TCP/IP. The current growth of the Internet is estimated at about a million new users each month. These new users include sophisticated computer and business users as well as home owners, students and children.

Advances in technology have added many new devices which can be hooked to computer networks and telephone networks including cellular telephones, printers, fax machines, automatic teller machines, cash registers or point of sale devices, and numerous other types of devices with new devices being added on an almost daily occurrence. With all of these devices seeking to communicate with one another, security has become a more and more important aspect of any type of network. In a client-server architecture, for example, a plurality of clients are typically in communication with an individual server. One problem that arises is whether a particular client has the right to communicate with the server, and at what level of privilege the communication should be allowed. When clients are attempting to communicate with other clients, the problem is similar, but the security issues become more complex. In some situations, the communications are directly between the clients, i.e. peer-to-peer communications. In other circumstances, the communications are routed through the server, i.e. from client A to the server and then from the server to client B. The numerous techniques for controlling access to both the clients and the servers and protecting the communication between the attached devices have included such techniques as passwords, encryption and various other methods for establishing the authenticity and identity of the clients and the servers and other devices.

In an effort to allow electronic or computing devices to communicate with one another, a system of addresses was devised, called IP addressing, in which sets of numbers are assigned to various manufacturers, these addresses being encoded into the devices themselves. Other sets of IP addresses are allocated to the registered owner of various types of networks. These addresses are allocated to devices which are attached to the network (i.e., a personal computer attached to a local area network). In this fashion, devices attached to the network can send information to other devices attached to the network by using this IP address. This does not assure that the message arrives at the desired device, but, rather, allows the initiating device to broadcast the message generally to the network and hopefully the recipient device is listening for a message with its IP address attached to the message.

Numerous difficulties have also arisen by simply having disparate equipment attached to a common network backbone. At a low level, these problems include different protocols (i.e., TCP/IP, NetBUI, NetBIOS, SNA, BNA, etc.) attempting to communicate with one another. At a higher level, the problems include different types of encryption schemes, different character sets (i.e., ASCII, EBCIC, etc.), different electrical specifications (i.e., 802.1, etc.) and so forth. Along with the differences in equipment are differences in uses of the systems themselves, which may include banking systems, telecommunication systems, office networks, wide area networks, cellular phone networks, cable television networks, and various types of e-commerce usages. Each of these systems retains its own unique characteristics, even when operating across the same medium.

In the client-server environment, passwords are typically used to identify the clients to the server, and this, in turn, establishes the authenticity of the person attempting to communicate with the server. Other techniques for identifying oneself to the server would be through use of encryption. These encryption schemes have typically used public keys and private keys which are generated on the server to allow the clients to identify themselves to the server. In this fashion, the clients and the servers negotiate with one another prior to establishing a link or dialog. In order to allow servers to connect to other servers, typically a name server may be established which lists all other servers and defines the privileges allowed between the servers.

One system for addressing the communications problem between clients was addressed at MIT in a system entitled Kerberos. In this system, a client requests to a particular server permission to speak to another client. The server returns to the requesting client a key which that client is to use when attempting to communicate with the receiving client. The server also sends that same key to the intended recipient in order for the recipient client to identify that a communication will be arriving at that recipient client, and if the communication contains that key, then it should be safe for the receiving client to communicate with that initiating client. The server also instructs the initiating client of the path to follow to get to that receiving client. One drawback with the Kerberos system is that if a malicious observer monitors the transmissions between the initiating client and the server and obtains valid keys from that server when they are sent from the server to the initiating client. Other problems include delayed transmissions, which have been addressed with some success through time-stamping.

Other systems which have experienced a great deal of inventive effort are banking systems, which typically include automatic teller machines connected to a central computer through a variety of techniques. The security in such systems is absolutely critical, and encryption and various other techniques have been used with a good deal of success. Some banking systems operate on dedicated lines which run from the ATMs to the central computer, thereby simplifying the problems of security. Even with these security systems in place, the transmissions are encrypted and also use considerable authentication from point to point.

In telecommunications, systems have been devised to verify the identity of the initiating phone call, verify the personal ID number of the person initiating a cellular call, distinguish the rights of a call initiator from a cell phone which is operating outside of its normal operating cell, perform caller identification for regular and cell phone telecommunication systems, block certain types of calls for both cellular and regular phone systems, and numerous other techniques which are currently being implemented.

In the field of e-commerce or electronic commerce (commerce transacted over the Internet), there are currently systems in place which enable secure transmission of information and to verify transactions. Systems have also been implemented which permit specific users to connect to specific sites, while excluding other persons from specific sites. In the present World Wide Web environment, new techniques are also being developed for sending certified mail and secure e-mail, which involve the verification of rights to send and the verification of rights to receive a particular message.

Each of these areas of network communication provide numerous benefits to the public in general, but each system also come with risks. One risk is that the information received across the network is either altered or false communications are sent directly to a receiving device. In systems as currently implemented, an overall problem is that the receiving client must be present when the transmission from the sending client is initiated. In e-mail systems, one well-known shortcoming is that the e-mail is transmitted from the sending client to the server, and then to the receiving client. It would be beneficial for the message to be sent directly from the sender to the receiver, thereby eliminating in large portion the problems of corruption of the message. It would also be beneficial to have a system which addressed the issues of devices attempting to communicate with incompatible devices where at least one of the devices has the ability to convert the communication to a compatible communication.

SUMMARY OF THE INVENTION

The present invention improves upon the existing art by providing methods and apparatus enabling dissimilar devices to exchange information over a computer network. According to a method aspect of the invention, a database of permissible sending and receiving devices is stored at a verification server. A first device generates a request send authorization signal, which is compared at the server to the stored database and, in the event of a correspondence, a send authorization signal is generated by the server, enabling a message to be transmitted from the first device to a second device.

However, before a complete exchange of information may occur, a request receive authorization signal is generated at the second device in response to receiving the communication signal from the first device. The request receive authorization signal is compared to the database at the server and, in the event of a correspondence, a receive authorization signal is generated by the server, causing the second device to receive the message from the first device.

The method is applicable to a wide variety of devices, including otherwise dissimilar or incompatible devices, including personal computers, cellular telephones, facsimile machines, pagers, and printers. As such, the method may further include the step of performing a translation function prior to the step of causing the second device to receive the message from the first device in response to the receive authorization signal. The translation function may be related to dissimilar device hardware, software device protocol, network security, domestic/international communication standards, language or other factors, as appropriate. Accordingly, in accordance with a precise implementation, the data structure at the verification server may comprise a rule table including, among other information, communications protocols, transmit allowance, receive allowance, and translation capabilities, each being stored on a per-device basis.

DETAILED DESCRIPTION OF THE INVENTION

Figure 1:
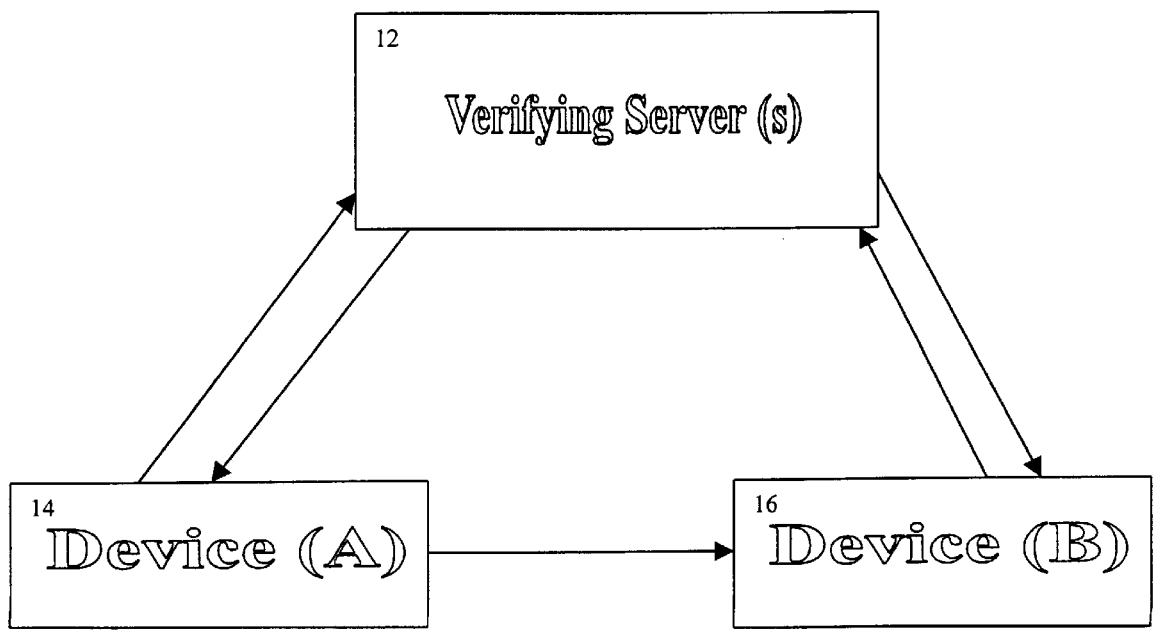
FIG. 1 is a diagram illustrating a basic configuration of the invention.

Making reference now to the illustrations, FIG. 1 depicts a basic environment within which the invention operates, including a verifying server 12, device A 14 and devices B 16. Devices 14 and 16 may be of any type of communication device, including but not limited to computers, phones, faxes, beepers, cellular communications devices, e-mail, and computer software. The server 12 may be any type of machine capable of storing a predetermined or configurable database of permissible recipient and sending devices, along with information, including information gained through adaptation, as to protocol conversion, language translation, and other functions which might be necessary to device compatibility.

More particularly, with respect to certain embodiments of the invention, the database will contain information as to the capability level of the sending and/or receiving devices, along with application programs necessary to translate the signals that may be sent by that device to an alternate form which may be required for the receiving device. The database may also contain pointers to other, external databases to aid the verification server in determining whether a sending device may send to a particular recipient device, or whether a recipient device may be capable of receiving information from a particular sending device. The verifying server may be of any type of computing device such as a mainframe computer, a network server or a local personal computer configured to function as a server.

The hardware interconnection between the various elements may represent any type of medium which may be required to communicate between the devices and the verification server. Such media may include telephone lines, fiber optic lines, off-air broadcasts of the type used for cellular type transmissions. In addition to the aforementioned media, signals may travel between the devices by way of other devices or servers, though not specifically represented in the drawings.

An initial step in the execution of a communication according to the invention takes place through device 14 as part of a request to communicate with device 16. In particular, device 14 generates a request-to-send (RTS) authorization signal which is transmitted to the server 12. This RTS authorization signal contains information which indicates to the verifying server that device A desires to communicate with a specified recipient. In this embodiment, the signal indicates to the verifying server that device 14 wishes to communicate with device 16. As discussed elsewhere herein, the verifying server preferably contains the information required to analyze the RTS authorization signal. This information is contained in a database which contains the set of permissible recipient devices for device A. The database also contains information related to device 16, including the types of messages that device 16 is capable of receiving.

When the verifying server determines that device A may communicate with device B, it generates a send authorization signal which indicates that device A may communicate with device B. The send authorization signal may also contain information which informs device A whether any translation of the data to be sent to device B is required. The procedure actually utilized to perform a required translation may reside with the server, with any of the devices wishing to communicate, or elsewhere on the network, even in distributed form, so long as the necessary components may be accessed and used to perform a required operation. For example, an entire translation process may be fully resident on a sending device, such that, given a relatively simple indication from the verification server, a message may be sent in translated form, assuming requisite authorization as discussed elsewhere herein. However, numerous alternatives to this basic procedure exist. For example, the server may alternatively download a script to a sending (or receiving) device, enabling that device to perform a function, or a group of functions, required for a particular translation. Such a script may be a high-level set of commands, or a low-level set of mathematical functions enabling, as one example of many, the use or modification of an encryption key having a particular bit length, to be modified in accordance with encryption software based upon a different type of key. Scripts of this type may be provided to a receiving device as well or, depending upon the circumstances, may be delivered to ascending and receiving device so as to coordinate a function therebetween. As yet a further alternative, the verification server may provide a sending or receiving device, or both, with addresses of other locations accessible through a network through which appropriate functions may be downloaded to perform any necessary translations.

With respect to this aspect of the invention, the term "translation" should be taken to mean any service of manipulation of the data required to ensure that two (or more) device communicate effectively. Thus, translation could include one or more conversions with respect to dissimilar hardware, software, or any combination thereof.

There are at least two major process through which this translation may be performed. The first is by the verification server itself, either automatically with stored rules, or through one or more techniques learned or perfected through adaptation. As one example of many, assume that an RTS authorization request includes some content which is unrecognizable by the verification server.

Such adaptation may utilize external databases or apply the results of self- or outside-initiated trial-and-error experimentation. For example, if the verification server is interconnected to the World Wide Web by way of the Internet, the server may automatically generate queries to other Web sites based upon keyword found in the RTS authorization signal. If a solution to the particular translational problem is identified, the communication may proceed, in which case the server may inform some or all of the participants that a particular translation algorithm was used for future reference. In any case, the procedures required for translation may be stored or further modified for future use.

As a alternative, especially if, or when, a particular communication request is complex or highly sensitive, the sending device may perform any necessary translation in advance, then educate the verification server, or the recipient, or both, as to the procedures which must be carried out in the future to ensure accurate and reliable correspondence.

In all cases, when the verifying server receives the request to receive authorization signal, a comparison is executed against the database to determine whether device B 16 is allowed to receive communication signals from the sending device. If the verifying server determines that device B is allowed to receive the communication signal from device A, the verifying server sends a receive authorization signal to device B. Upon receipt of the receive authorization signal, device B will begin receiving communication signals from device A 14.

Figure 2:
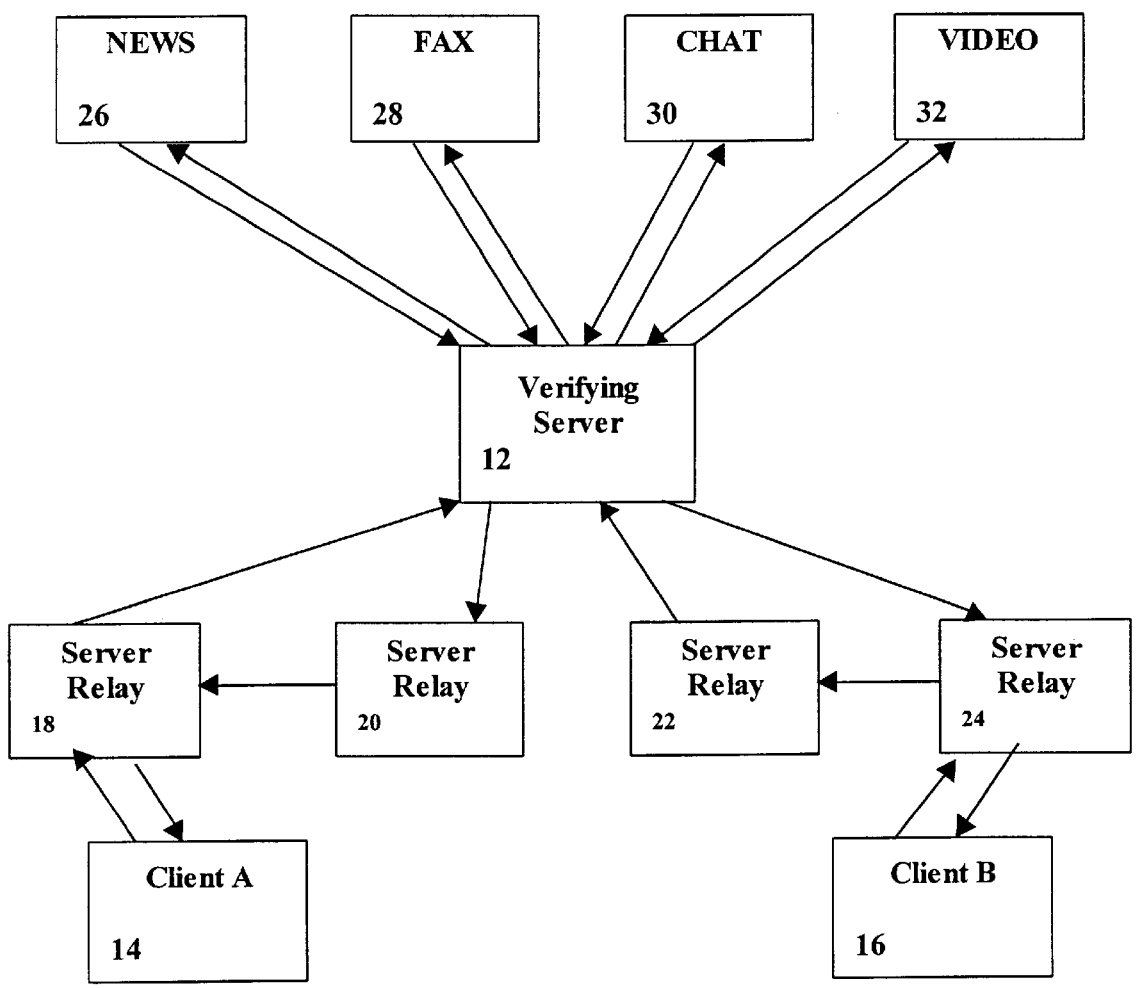
FIG. 2 is a diagram which illustrates an embodiment of the invention wherein client computers interact with a set of server relays.

With reference now to FIG. 2 an alternative embodiment is shown. One difference between the first embodiment of FIG. 1 and that of FIG. 2 is the interposition of server relays placed between the client devices and the verification server. The positioning of these server relays between the clients and the verification server is to enable the clients to communicate with one another but to hide the location of the verification server from the clients. The positioning of the server relays also prevents other outside parties from monitoring communications between the verification server and the clients to appropriate the information in those communications for unwanted purposes.

In FIG. 2, when client A desires to communicate with client B, client A generates a request send authorization signal as seen in the preferred embodiment and transmits that signal to server relay 18. By interposing the server relay between the client and the verification server, the location of the verification server may be hidden from client A while still allowing full operability.

The server relay 18 transmits the request send authorization signal to the verification server 12, which operates as in FIG. 1. However, although the verification server determines whether the request send authorization signal is within the database of permissible recipient devices, the send authorization signal is transmitted to server relay 20 which retransmits the send authorization signal to server relay 18 which in turn transmits the send authorization signal to client A. These additional intermediate steps are operative to increase the security of the information transmitted over whatever medium is used.

As in the case of FIG. 1, client A sends a communication signal to device B, which may be directly or via any available pathway between client A and client B. Client B receives the communication signal from the device A it generates a request receive authorization signal which is transmitted to server relay 24. Server relay 24 in this embodiment retransmits the request receive authorization signal to server relay 22. Server relay 22 retransmits the request receive authorization signal to the verification server 12 which has in the first preferred embodiment determines whether the client 16 is authorized to receive communication signal from client A. In the event that client B is allowed to receive from client A, a receive authorization signal is sent to server relay 24 which in turn retransmits the receive authorization signal to client B. Client B then begins receiving communication signals from client A.

The invention solves problems associated with communication between various disparate types of devices by allowing one ID that all equipment can know for each device used for communication. Through the use of one ID, the system can find out the capabilities of the receiving device from the verification server. It also solves the problem of delivering communications to a wrong party by making both device A and device B request permission from the verification server. To expedite communications, the verification server may contain a preset list of allowable devices.

The invention also solves certain problems caused by delayed communication. These delayed communications can be send and verified that the proper device received it. By allowing the verification server to access other databases as discussed elsewhere herein, the information required for a particular communication need not be all maintained on the verification server but the verification server can access the information which may change (i.e. a phone number or a IP address). These updates can be made in such a fashion that they are invisible to both sending and receiving clients.

Another benefit of the invention is that the system can be used to verify that a particular device is located in a particular country and to use this information to prevent critical information from falling into the wrong hands. The United States and other countries have rules and regulations based upon what type of information can be exported (i.e. encryption software). Information such as this, would be the type of information maintained on the verification server and when the verification server receives a request send authorization signal, the verification server would deny the authority to the client to send said information to the receiving client. An additional benefit is achieved through the control of use of software by means of verifying each time the program or device is run, the device is allowed to use, based upon registration information based in the data base on the verification server.

The invention realizes further utility through the maintenance of information regarding diversion of the devices so that the device upgrades can be offered for devices that are considered to be out of date. Unlike the previously known methods for communication and verification between devices, the invention can provide required functionality in a more efficient and economical fashion and also provide security features which have been heretofore impossible.

Figure 3:
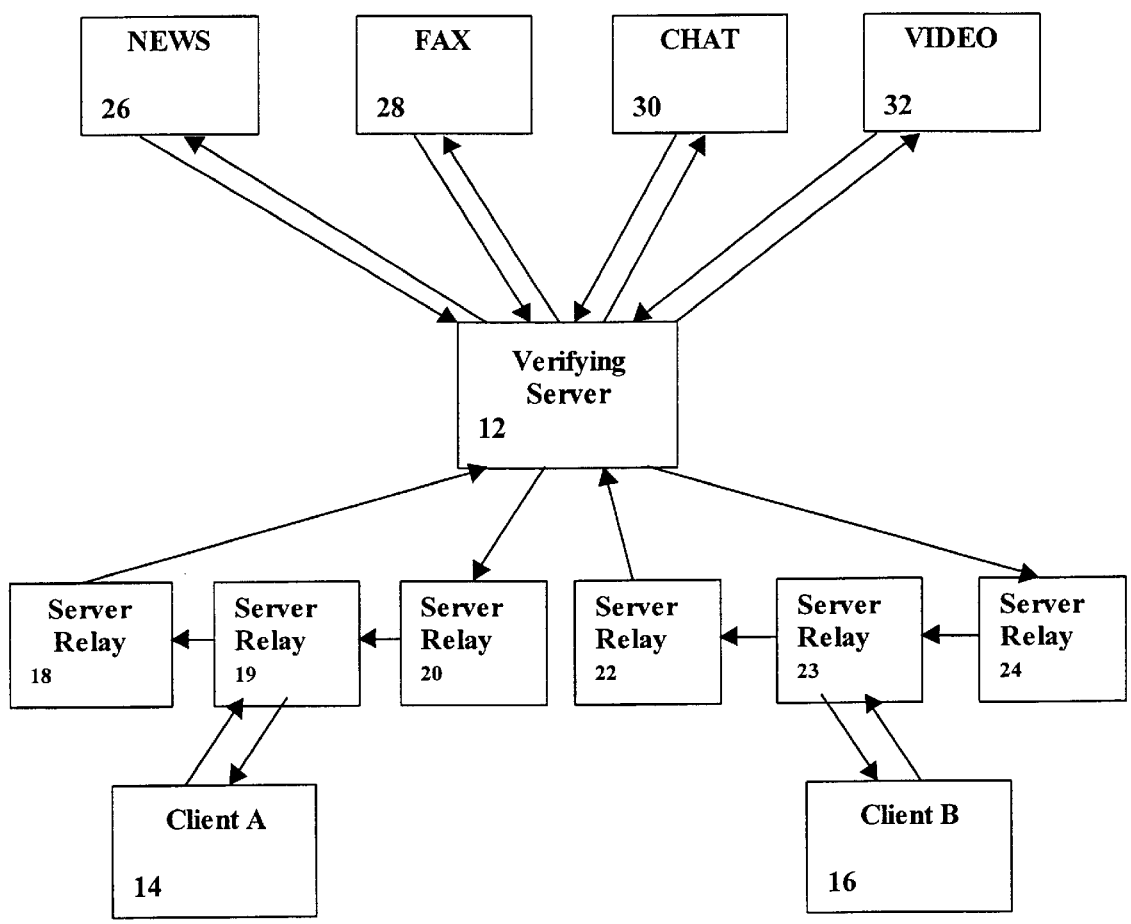
FIG. 3 is a diagram which illustrates a different embodiment of the invention wherein the client computers interact with a different set of server relays.

FIG. 3 depicts another alternative embodiment of the invention which accommodates a further isolation of the clients from the verification server. This configuration is similar to that shown in FIG. 2 in that server relays are implemented between the respective clients and the verification server. In this particular embodiment, client A need only be aware of one server relay 19 in order to receive the authorization from the verification server. Client A sends an RTS authorization signal to server relay 19 which forwards the request send authorization to server relay 18.

In this fashion, neither client A nor server relay 19 need know the location of the verification server 12. Server relay 18 forwards the request send authorization signal to the verification server which determines based upon its data base a permissible recipient and sending devices whether the request send authorization signal is within said data base and if it is within that data base, sends an authorization signal to server relay 20 which forwards said send authorization signal to server relay 19. Server relay 19 forwards the send authorization signal to client A which will begin sending the communication signal to client B. Client B upon receipt of the communication signal sends a request receive authorization signal to server relay 22 which forwards the request receive authorization signal to server relay 23. Server relay 23 then forwards the request receive authorization signal to the verification server. The verification server then compares the request receive authorization signal with the data base of permissible sending devices for client B and if that signal is within said data base, sends a receive authorization signal to server relay 23. Server relay 23 merely relays the receive authorization signal to server relay 24 which sends said signal to client B.

According to the embodiment of FIG. 3, neither client A nor client B has direct communication with any server relay in direct communication with the verification server. A heightened level of security is accordingly available for transmissions. An additional level of security is provided in that the location of the verification server is not known by either client A nor client B, yet the entire functionality of the invention remains available to either node.

Figure 4:
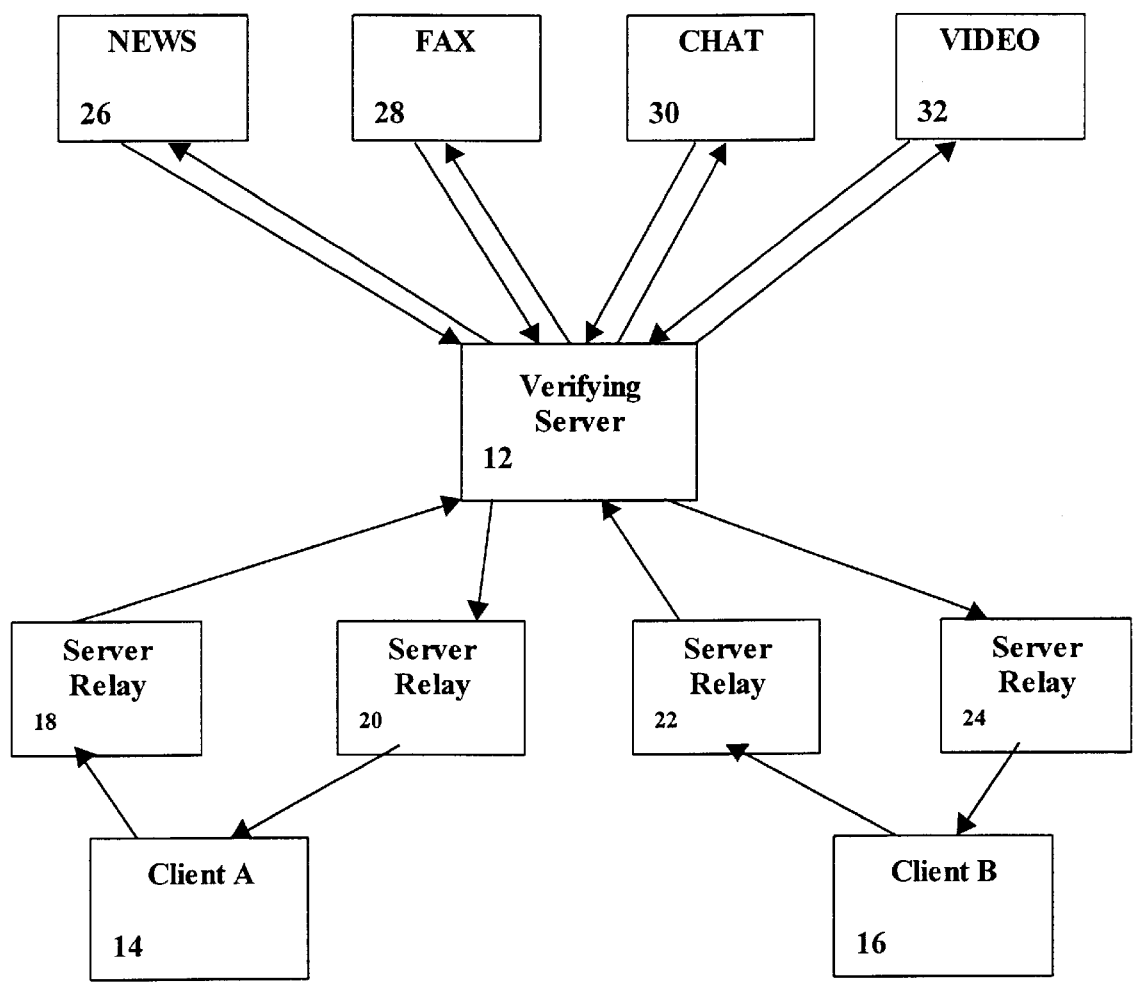
FIG. 4 is a diagram which illustrates yet a further embodiment of the invention wherein a different set of server relays communicate through each client computer.

FIG. 4 depicts yet a further alternative embodiment wherein additional security features are available. In this embodiment, for both client A and client B, the sending and receiving communication paths are totally isolated from one another, thereby guarding against unwanted monitoring of communications. By separating the transmission and reception paths, a person seeking to monitor the signals being sent and received has a much greater task ahead of them. Monitoring just one of the paths would not give an intruder the information needed to mimic the signals and attempt to undermine the overall security of the system.

In this embodiment, as shown in FIG. 4, client A initiates communication by sending a request send authorization signal to server relay 18. Server relay 18 forwards the request send authorization signal to the verification server. The verification server compares the signal with the data base of permissible recipient devices and if the request send authorization signal is within the permissible set of recipient devices, the verification server sends a send authorization signal to server relay 20. Server relay 20 then forwards that send authorization signal to client A. Client A then begins sending communication signals to client B.

When client B receives said communication signal from client A, client B sends a request receive authorization signal to server relay 22. Server relay 22 then sends said signal to the verification server 12. The verification server then compares said request receive authorization signal with the data base of permissible sending devices and generates a receive authorization signal whenever said request receive authorization signal is within said data base of permissible sending devices. The verification server sends the receive authorization signal to server relay 24 which then forwards the signal to client B.

It should be noted that the verification server employed in all embodiments of the invention are capable of communicating with external data bases such as the news db, fax db, chat db, video db and phone db in order to acquire the information required to determine whether a translation is required by the sending client.

It is also envisioned that the verification server is capable of doing reverse type translation analysis. That is, when a verification server receives a request to send authorization signal, the verification server is capable of determining whether the receiving client is capable of translating the communication signal sent by the initiating client in order to interpret the communication signal sent. In accordance with this modality, client B is not entirely reliant upon the translation capabilities of client A.

Figure 5:
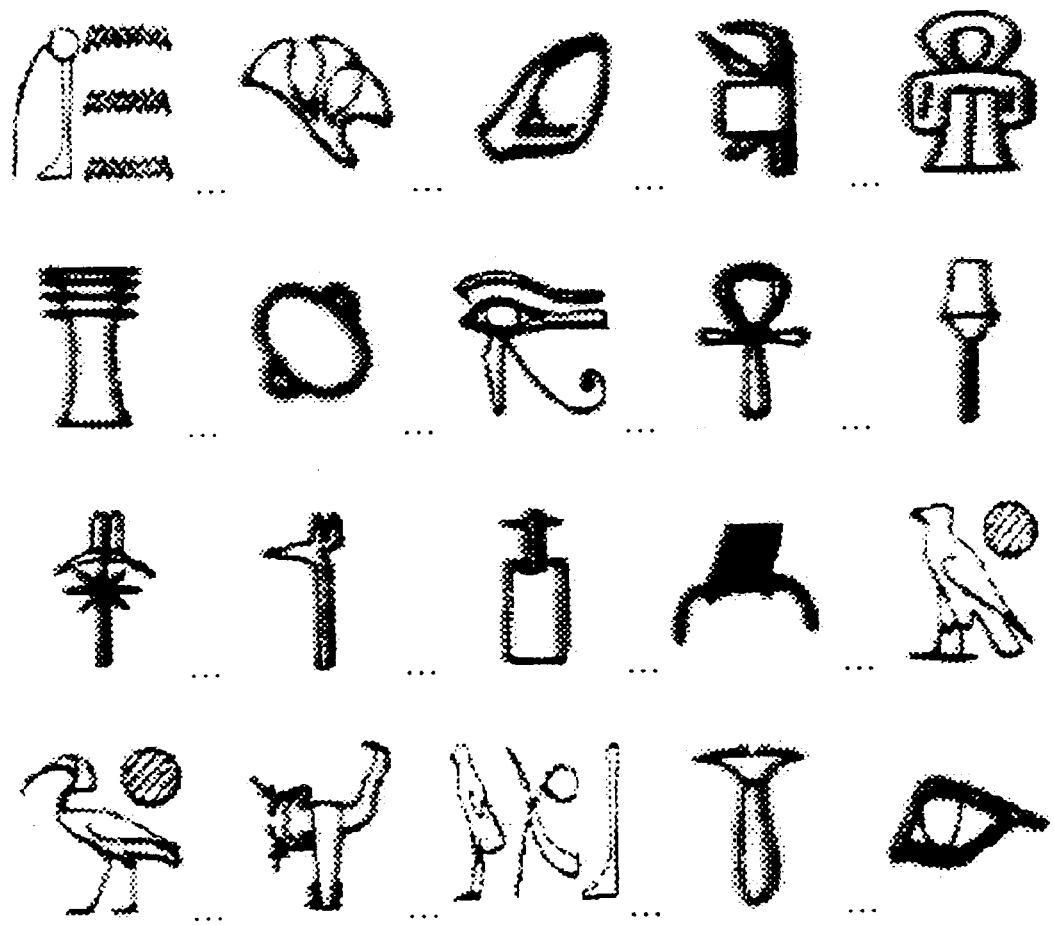
FIG. 5 is a drawing which shows a plurality of visual symbols that may be used to gain access to a system according to this invention.

In conjunction with the various authorization aspects described herein, this invention contemplates the use of a novel password system, which will now be discussed with reference to FIG. 5. This figure shows an arrangement of visual symbols, specifically, a matrix of 20 Egyptian hieroglyphics. It should be understood at the onset, however, that this aspect of the invention is not limited to the use of these particular symbols, or the arrangement shown, insofar more or fewer symbols may be utilized in alternative arrangements. Thus, in place of hieroglyphics, geometric symbols, colors or any other type of picture may be used. Indeed, as will become apparent from the discussion below, sounds may alternatively be utilized in place of pictures. In addition, although only one level of symbols is presented in FIG. 5, as discussed below, the activation of one symbol may, in fact, lead to a new level, such that the system assumes a three-dimensional matrix.

In a preferred embodiment, when a user at a computer is attempting to gain access to the system, whether at the location of a sending device, receiving device, or a verification server, for that matter, he or she is first presented with a "blank slate," which is preferably in the form of a stone-like surface appearance with none of the symbols (or sounds) being evident. Certainly other backgrounds in addition to a stone-like appearance may be used, including a totally blank screen. However, as the user moves a pointer around the screen using a mouse or other such device, the symbols begin to at least temporarily appear when the position of the pointer coincides with the position of an underlying symbol. Authorization is provided by a clicking on a particular number of symbols, preferably in a particular order, as they become visible through the movements of the pointing device. As a further aid in user verification, a new arrangement of the symbols, or an entirely new set of symbols is presented each time a user wishes to gain access to the system, so that an unauthorized user cannot simply memorize the character positions while watching an authorized user can access.

The password system just described is preferably utilized in conjunction with an identical code, and the code and the password are then compared before user (or device) approval. This ID code may be gathered in a variety of ways, including the usual inputting of a user ID code prior to downloading the password symbols or, as an alternative, the registration of a machine number which is then automatically used to generate a set of symbols (or sounds) containing the items which a user then identifies for complete authorization. The visual or audio items may be generated on a random or pseudo-random basis, so long as the resulting arrangement includes the symbols associated with a particular user required for verification.

We claim:

1. A method enabling devices to exchange information over a computer network, comprising the steps of:
    storing a database of permissible sending and receiving devices at a verification server;
    generating a request send authorization signal at a first device;
    comparing the request send authorization signal to the database at the server and, in the event of a correspondence, generating a send authorization signal;
    sending a message from the first device to a second device in response to the send authorization signal;
    generating a request receive authorization signal at the second device in response to receiving the communication signal from the first device;
    comparing the request receive authorization signal to the database at the server and, in the event of a correspondence, generating a receive authorization signal; and
    causing the second device to receive the message from the first device in response to the receive authorization signal.

2. The method of claim 1, wherein the first device and the second device are selected from the group consisting of:
    computers, cellular telephones, facsimile machines, pagers, and printers.

3. The method of claim 1, wherein the first device and the second device are dissimilar, and the method further includes the step of performing a translation function prior to the step of causing the second device to receive the message from the first device in response to the receive authorization signal.

4. The method of claim 3, wherein the first device and the second device are dissimilar in terms of their hardware, and wherein the step of performing the translation function is related to the hardware dissimilarity.

5. The method of claim 3, wherein the first device and the second device are dissimilar in terms of the languages which they recognize, and wherein the step of performing the translation function is related to the language dissimilarity.

6. The method of claim 3, wherein the first device and second device are dissimilar in terms of the software device protocols which they utilize, and wherein the step of performing the translations function is related to the difference in software device protocol.

7. The method of claim 3, wherein the first device and the second device are dissimilar in terms of an international communications standard, and wherein the step of performing the translation function is related to the difference in the international communications standard.

8. The method of claim 3, wherein the first device and the second device are different in terms of network security, and wherein the step of performing the translation function is related to the difference in network security.

9. In a network involving a plurality of devices, a method of providing secure and reliable communications between a device A and a device B, comprising the steps of:
    providing a verification server;
    seeking permission to send a communication signal from device A to device B by sending a request send authorization signal from device A to the verification server;
    determining whether device A may communicate with device B and, if authorized to do so, transmitting a send authorization signal to device A;
    receiving the send authorization signal at device A, and transmitting a communication signal to device B to establish communications therewith;

seeking permission to receive the communication signal at device B by sending a request receive authorization signal from device B to the verification server;

determining whether device B may communicate with device A and, if authorized to do so, transmitting a receive authorization signal to device B from the verification server; and receiving the receive authorization signal at device B and processing the communication signal transmitted by device A.

10. The method of claim 9, wherein device A and device B are selected from the group consisting of:

personal computers, cellular telephones, facsimile machines, pagers, and printers.

11. The method of claim 9, further including the step of performing a translation function prior to the step of causing device B to receive the message from device A in response to the receive authorization signal.

12. The method of claim 11, wherein the first device and the second device are dissimilar in terms of their hardware, and wherein the step of performing the translation function is related to the hardware dissimilarity.

13. The method of claim 11, wherein the first device and the second device are dissimilar in terms of the languages which they recognize, and wherein the step of performing the translation function is related to the language dissimilarity.

14. The method of claim 11, wherein the first device and second device are dissimilar in terms of the software device protocols which they utilize, and wherein the step of performing the translation function is related to the difference in software device protocol.

15. The method of claim 11, wherein the first device and the second device are dissimilar in terms of an international communications standard, and wherein the step of performing the translation function is related to the difference in the international communications standard.

16. The method of claim 11, wherein the first device and the second device are different in terms of network security, and wherein the step of performing the translation function is related to the difference in network security.

17. The method of claim 11, further including the steps of:

providing, at the verification server, a data structure comprising a rule table including, with respect to each device;

protocols, transmit allowance, receive allowance, and translation capabilities; and determining whether the communication signal may be sent by the first device and received by the second device in accordance with the data structure.

18. An adaptive communication system enabling dissimilar devices to exchange information through a verification server, comprising:

means enabling a first device to generate a "request send authorization signal";

means for the verification server, in response to the receipt of the "request send authorization signal", to compare said "request send authorization signal" with a predetermined database of permissible recipient and sending devices, and for generating a "send authorization signal" whenever said "request send authorization signal" is within said database;

means for causing the first device, in response to the receipt of the "send authorization signal," to send a "communication signal" to a second device;

means for causing the second device, in response to the arrival of communication signal from the first device to generate a "request receive authorization signal";

means for causing the verification server, in response to the receipt of the "request receive authorization signal", to compare the "request receive authorization signal" with the database, and to generate a "receive authorization signal" whenever the "request receive authorization signal" is within the database; and means for causing the second device, in response to the "receive authorization signal," to receive the communication signal from the first device.

19. The system of claim 18 wherein:

the first and second devices are selected from the group consisting of:

personal computers, cellular telephones, facsimile machines, pagers, and printers.

20. The system of claim 18, further comprising:

a data structure within the verification server including a rule table containing protocols, transmit allowance, receive allowance, translation capabilities in conjunction with each device.

21. In a distributed communications environment comprising at least one server device and a plurality of network devices wherein the network devices and server are linked together by a communications network, a method of communications, comprising the steps of:

storing a capabilities data structure on the server device including, for each network device, protocols, transmit allowance, receive allowance, and translation capabilities;

generating, by a first network device, a request to allow transmission of a message to a second network device;

transmitting the request to a server device;

receiving the request by the server device;

comparing the capabilities of the first network device to the capabilities device of the second network device to determine whether the request should be granted;

transmitting a response to the first network device; and transmitting the message from the first network device to the second network device if the response from the server device indicates that the capabilities of the first network device are compatible with the capabilities of the second network device.

* * * * *